(12) United States Patent
Bazzinotti et al.

(10) Patent No.: US 7,376,743 B1
(45) Date of Patent: May 20, 2008

(54) METHOD AND APPARATUS FOR LOAD BALANCING IN A VIRTUAL PRIVATE NETWORK

(75) Inventors: John Bazzinotti, Norwood, MA (US); Peter Scott Davis, Wakefield, MA (US); Kenneth John Wante, Bellingham, MA (US); Timothy Steven Champagne, South Attleborough, MA (US); Dany J. Rochefort, Norfolk, MA (US)

(73) Assignee: Cisco Technology, Inc., San Jose, CA (US)

( * ) Notice: Subject to any disclaimer, the term of this patent is extended or adjusted under 35 U.S.C. 154(b) by 772 days.

(21) Appl. No.: 10/282,816

(22) Filed: Oct. 29, 2002

Related U.S. Application Data

(60) Provisional application No. 60/369,280, filed on Apr. 2, 2002.

(51) Int. Cl.
   G06F 15/16 (2006.01)
   G06F 15/177 (2006.01)
   G06F 15/173 (2006.01)
   G06F 3/00 (2006.01)
   G06F 5/00 (2006.01)
   G06F 11/00 (2006.01)
   G01R 31/08 (2006.01)
   G08C 15/00 (2006.01)
   H04J 1/16 (2006.01)
   H04J 3/14 (2006.01)
   H04L 1/00 (2006.01)
   H04L 12/26 (2006.01)

(52) U.S. Cl. .................. 709/229; 709/220; 709/226; 710/38; 370/236; 370/237

(58) Field of Classification Search ......... 709/227–229
   See application file for complete search history.

(56) References Cited

U.S. PATENT DOCUMENTS

| | | | |
|---|---|---|---|
| 6,006,259 A | 12/1999 | Adelman et al. | 709/223 |
| 6,061,796 A | 5/2000 | Chen et al. | 713/201 |
| 6,078,957 A | 6/2000 | Adelman et al. | 709/224 |
| 6,158,011 A | 12/2000 | Chen et al. | 713/201 |
| 6,247,050 B1* | 6/2001 | Tso et al. | 709/224 |
| 6,317,838 B1 | 11/2001 | Baize | 713/201 |
| 6,567,377 B1* | 5/2003 | Vepa et al. | 370/230 |
| 6,658,595 B1* | 12/2003 | Thamattoor | 714/11 |
| 6,704,282 B1 | 3/2004 | Sun et al. | 370/237 |
| 6,717,576 B1* | 4/2004 | Duluk et al. | 345/419 |
| 6,718,359 B2* | 4/2004 | Zisapel et al. | 718/105 |
| 6,721,713 B1* | 4/2004 | Guheen et al. | 705/1 |

(Continued)

Primary Examiner—Bunjob Jaroenchonwanit
Assistant Examiner—Angela Widhalm
(74) Attorney, Agent, or Firm—Barry W. Chapin, Esq.; Chapin IP Law, LLC

(57) ABSTRACT

In a virtual private network, a plurality of concentrators form an interface to provide client/remote site access to a private network over a public network. The plurality of concentrators are grouped into a virtual cluster. Each concentrator in the virtual cluster has an IP address and the virtual cluster has a virtual IP address. In operation, one of the plurality of concentrators assumes the virtual IP address and acts as the master device in the cluster. When a client attempts a connection to the private network, the client addresses an initial request to the virtual IP address. The master device responds to the client request by transmitting to the client the IP address of a concentrator in the cluster selected to handle the connection.

13 Claims, 8 Drawing Sheets

U.S. PATENT DOCUMENTS

| | | | |
|---|---|---|---|
| 6,788,692 B1 | 9/2004 | Boudreau et al. | 370/400 |
| 6,826,182 B1* | 11/2004 | Parthasarathy | 370/390 |
| 6,950,855 B2* | 9/2005 | Sampathkumar | 709/209 |
| 7,012,893 B2* | 3/2006 | Bahadiroglu | 370/231 |
| 7,062,559 B2* | 6/2006 | Yoshimura et al. | 709/226 |
| 7,154,889 B1* | 12/2006 | Rekhter et al. | 370/392 |
| 2001/0052016 A1* | 12/2001 | Skene et al. | 709/226 |
| 2002/0065848 A1* | 5/2002 | Walker et al. | 707/511 |
| 2003/0069972 A1* | 4/2003 | Yoshimura et al. | 709/226 |
| 2004/0071087 A1* | 4/2004 | Siev et al. | 370/235 |
| 2004/0078633 A1* | 4/2004 | Holland | 714/5 |

* cited by examiner

METHOD AND APPARATUS FOR LOAD BALANCING IN A VIRTUAL PRIVATE NETWORK

CROSS REFERENCE TO RELATED APPLICATIONS

This application claims the benefit of priority under 35 U.S.C. 119(e) to U.S. Provisional Application Ser. No. 60/369,280, filed Apr. 2, 2002 and entitled "Methods and Apparatus for Operating a Virtual Private Network," the teachings of which are hereby incorporated by reference in their entirety.

BACKGROUND OF THE INVENTION

A virtual private network (VPN) is a type of private network constructed by using public network infrastructure to connect divergent nodes. An example of a VPN uses virtual connections or tunnels routed through the Internet between a company's private central network and a remote site or to a remote employee on the road or working from home.

In a VPN, one or more concentrators provide remote clients with a plurality of points of access to the central server. A concentrator is a type of multiplexor that combines multiple channels onto a single transmission medium in such a way that all the individual channels can be simultaneously active. In the VPN, the concentrators are at the threshold of the central site receiving requests for connections from, typically, many VPN clients. Each concentrator has a unique IP address by which VPN clients address the concentrator within the VPN. Typically, a VPN client has the IP address of only one concentrator. This means that each client accesses the central site through the one concentrator that particular client "knows."

VPNs are constructed to operate over a public network typically through the use of a combination of data encapsulation, data encryption and user authentication. A variety of mechanisms are used to provide network security for access and data integrity in a VPN. VPNs may use either symmetric-key encryption or asymmetric (i.e. public) key encryption. A protocol commonly used in VPNs is IPsec. IPsec, which stands for Internet Protocol Security, is a set of protocols developed by the Internet Engineering Task Force to implement VPNs. IPsec supports the secure exchange of data packets at the Internet Protocol (IP) network layer. IPsec supports two encryption modes: transport, and tunnel. Transport mode encrypts only the data portion, that is, the payload, of each packet, but leaves the header untouched. Tunnel mode is more secure as it encrypts both the header and the payload. In tunneling, the packet to be sent to the central network is encapsulated within another packet and is then sent over the VPN connection to the central site. On the receiving side, an IPsec-compliant device decrypts each packet. In IPsec, the sending and receiving devices share a public key. IPsec uses a protocol called Internet Security Association and Key Management Protocol/Oakley (ISAKMP/Oakley), which allows the receiver to obtain a public key and authenticate the sender using digital certificates.

SUMMARY OF THE INVENTION

Conventional VPN concentrator technology suffers from a variety of difficulties. As an example, conventional VPN concentrators do not efficiently support load balancing. That is, generally, where there are a plurality of concentrators, there may be situations during which there are many client connections on one concentrator and few client connections on the others. Conventional VPN technology does not provide an efficient mechanism to distribute existing connections or future incoming connections to other VPN concentrators. This is a result of the typical case where each client has the IP address of only one concentrator and it is the same concentrator for many of the clients. The problems created by this are increased latency and, in some situations, overloading of the concentrator. This conventional configuration also introduces risk in that if that one concentrator fails, many clients lose the ability to connect to the central site because the clients have no alternative means of discovering another concentrator with which to establish a connection. It is therefore desirable to have VPN access with load balancing, that is, the ability to have VPN clients shared across multiple concentrators without user intervention such as resetting VPN concentrator IP addresses known to VPN clients. Embodiments of the present invention significantly overcome such deficiencies and provide a method and system for load balancing in a VPN.

According to embodiments of the invention, a VPN virtual cluster has a plurality of concentrators accessible to clients through a single cluster IP address. The concentrators have one master concentrator to take client requests and distribute the client requests among the concentrators in the cluster. Each concentrator has a unique IP address, however each client knows only the cluster IP address used for the initial connection request. When a client request arrives at the VPN concentrator cluster, the master concentrator, which responds to requests directed to the cluster IP address, selects a concentrator from the cluster to handle the request. The master concentrator sends the unique IP address of the selected concentrator to the client for connection to the central site. The master concentrator can track load in the cluster and monitor which concentrators are operational and which are not. If the master concentrator fails, embodiments of the invention provide a mechanism to allow a new master concentrator to take over. The master concentrator provides load balancing and the shared connections among a cluster of concentrators provides redundancy that enhances concentrator availability.

In one embodiment of the invention, a method of connecting to a virtual private network includes receiving an initial request for a connection to the virtual private network at a virtual cluster IP address. The virtual cluster IP address provides a public interface for a plurality of network interface devices, such as concentrators, forming a virtual cluster. The method next includes selecting, by a master network interface device in the virtual cluster which network interface device will service the requested connection. Next, the master device transmits to a connection requester an IP address of the selected network interface device. The selected network interface device services the requested connection. In this way, the master device is able to distribute connections to the virtual private network among the network interface devices in the virtual cluster.

In another embodiment of the invention, the step of selecting is based on a connection load on each network interface device in the virtual cluster. In this way, the master device distributes connections in the virtual cluster in such a way that those devices best able to handle new connections aware selected.

In one embodiment of the invention, the load is defined as a current number of connections in a particular network interface device divided by a maximum number of allowed connections for the particular network interface device. In another embodiment of the invention, the maximum number of allowed connections is reconfigured in order to control the load on the particular network interface device.

In another embodiment of the invention, the step of selecting is based on the number of hops between a connection requester and are requested server in the virtual private network. With this criterion, the virtual cluster provides the client with an efficient connection to the virtual private network. In another embodiment of the invention, the step of selecting is based on packet latency associated with each of the network interface devices in the virtual cluster. With this criterion, the virtual cluster provides the client with a low latency connection.

In another embodiment of the invention, the selecting step includes selecting a network interface device such that the network interface device is less loaded than the other devices in the virtual cluster. In this way, the master device works to ensure that it has the resources to provide load balancing in the virtual cluster.

In another embodiment of the invention, the step of servicing the requested connection includes transmitting updated load data by the selected network interface device to the master device. In this way, the master device is able to update the cluster topology.

In another embodiment of the invention, the master device periodically transmits the cluster topology to the other network interface devices in the virtual cluster. Each network interface device in the virtual cluster thereby knows the topology of the virtual cluster and is able to act as master device in the event that already-elected master device fails.

In another embodiment of the invention, each network interface device has a priority, typically based on hardware and software capability of the particular network interface device. When a master device in the virtual cluster fails, the remaining network interface devices elect a new master device based on relative priority of the remaining network interface devices.

In another embodiment of the invention, a method for balancing incoming client connection requests by a master concentrator device in a cluster of concentrator devices includes receiving load data describing current load conditions of the concentrator devices in the cluster. In this method, the cluster has a virtual cluster address for providing a public interface for receiving client VPN connection requests for access to the VPN. The method further includes receiving from a client an initial client connection request directed to the virtual cluster address. After receiving the initial client connection request, the master device selects based on load data in the cluster one concentrator in the cluster to handle the VPN connection from the requesting client to the VPN. The master device then transmits the address of the selected concentrator to the client. In this way, the master device balances load in the cluster of concentrators by selecting a concentrator best able to handle a new VPN connection.

In another embodiment of the invention, the master device receives load data from the concentrators in the cluster in the form of a KEEPALIVE message transmitted on a reoccurring basis by the concentrators. In this way, the master device is able to maintain a topology record of the cluster. In another embodiment of the invention, the KEEPALIVE message includes least loaded concentrator device data.

In another embodiment of the invention, the master device records missed KEEPALIVE messages and removes a concentrator device from the cluster topology if the concentrator device misses a number of KEEPALIVE messages. In one embodiment of the invention, the number of misses is three. In this way, the master device maintains a current topology of the cluster and avoids selecting an inoperational concentrator device to handle new VPN connection requests.

In another embodiment of the invention, the master device periodically sends a cluster topology message to each concentrator device in the cluster. In this way, all concentrator devices are aware of the cluster topology and any one of the concentrator devices can take over as master device if necessary.

In another embodiment of the invention, the method of selecting step a concentrator device to handle a VPN connection includes selecting a concentrator device from among the devices in the cluster such that the master concentrator device has a low load with respect to the other concentrator devices of the cluster. In this way, the master device conserves its resources for handling initial client requests at the cluster public interface.

In another embodiment of the invention, the method of selecting includes selecting a concentrator device based on the number of "hops" between the virtual private network client and a requested server in the virtual private network. In this way, an efficient route for the VPN connection is selected.

In another embodiment of the invention, the method of selecting includes selecting a concentrator device based on packet latency associated with each of the concentrator devices in the cluster. In this way, the fastest connection for the client request is selected.

In another embodiment of the invention, the initial client connection request is an IKE request and the method further includes negotiating authentication and encryption policies with the client in response to the IKE request. The method further includes transmitting to the client the address of the selected concentrator device, the device to handle the VPN connection, via an IKE notify payload message. In this way, the master device creates a secure connection between the virtual cluster and the client.

In another embodiment of the invention, a network interface device has a network interface device IP address component that provides a public interface for handling connections assigned by the master device in the virtual cluster to the network interface device. The network interface device also has a priority component to store a priority which is used in determining a role of the network interface device in the virtual cluster. Roles include master and non-master. The network interface device also has a role component to store the role of the network interface device. The network interface device also has a load component to store connection load and a topology component to store the virtual cluster topology. The network interface device, having these components, is able to act as master device distributing connections to balance the load in the virtual cluster and is also able to act as a non-master device servicing the connections assigned to it by the master device.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

DETAILED DESCRIPTION

In a virtual private network, a plurality of concentrators form an interface to provide client/remote site access to a private network over a public network. The plurality of concentrators are grouped into a virtual cluster. Each concentrator in the virtual cluster has an address and the virtual cluster has a virtual address. In operation, one of the plurality of concentrators assumes the virtual address and acts as the master device in the cluster. When a client attempts a connection to the private network, the client addresses an initial request to the virtual address. The master device responds to the client request by transmitting to the client the address of a concentrator in the cluster selected to handle the connection. The selected concentrator, in one embodiment, is the least-loaded concentrator, however other selection criteria is possible. The client receives the address of the selected concentrator from the master device and uses that address to attempt connection to the private network.

The master device, in addition to responding to connection requests received from clients addressed to the virtual address and balancing the load by allocating active session connections between the non-master active concentrators in the virtual cluster, also maintains load information from non-master active concentrators and administers cluster topology including addition and deletion of concentrators from the VPN virtual cluster.

Figure 1:
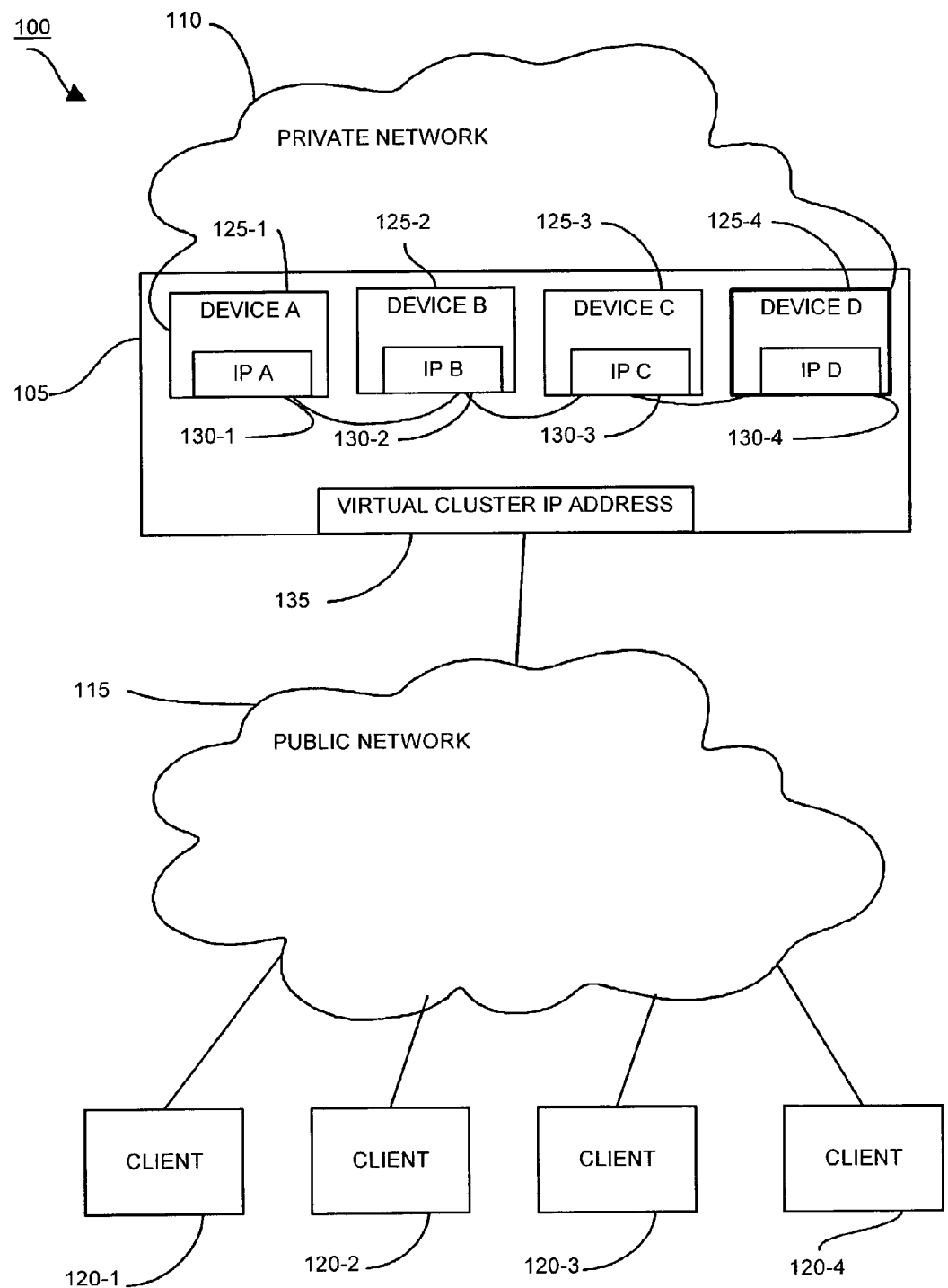
FIG. 1 is a block diagram of a computer network environment including a virtual cluster according to principles of the present invention.

FIG. 1 is a computer network environment 100 including a VPN virtual cluster 105 according to the principles of the invention. In the computer network environment 100, a private network 110, such as a corporate LAN, is connected to a public network 115 such as the Internet. A plurality of clients 120 are connected to the public network 115. The virtual cluster 105 is the interface of the private network 110 to the public network 115.

The virtual cluster 105 has a plurality of network interface devices 125, such as concentrators. Each concentrator 125 has a public IP address 130 and a private IP address 160. The virtual cluster 105 also has a Virtual Cluster Public IP Address (VCPIP) 135. The VCPIP 135 is a valid routable public address. Further, the VCPIP 135 is a valid IP address within the concentrators' public side LAN subnet. One of the concentrators 125 in the VPN cluster 105 is a master device, also referred to as the virtual cluster master device (VCM). In this arrangement, the master device is Device D 125-4. Each network interface device 125 in the virtual cluster 105, however, has the capability of being a master device. This provides virtual cluster reliability in that, if a master device becomes inoperable, any other device in the virtual cluster 105 is capable of assuming the role of master device.

To accomplish load balancing in the VPN network, the concentrators work together as a single entity forming the VPN cluster 105. The VPN cluster 105 is known by the virtual cluster IP address, the VCPIP 135, to the clients 120 connected to the public network 115. The VCPIP 135 is not tied to any one concentrator 125 in the VPN cluster 105. The VCPIP 135 is serviced by any member concentrator 125 of the VPN cluster 105 acting as a virtual cluster master device (VCM). The concentrators in the cluster are not required to be the same type and typically the most powerful concentrator in the cluster becomes VCM. This can be reconfigured as will be described below. In the present embodiment, therefore, Device D 125-4 responds to messages received at the VCPIP 135.

Figure 2:
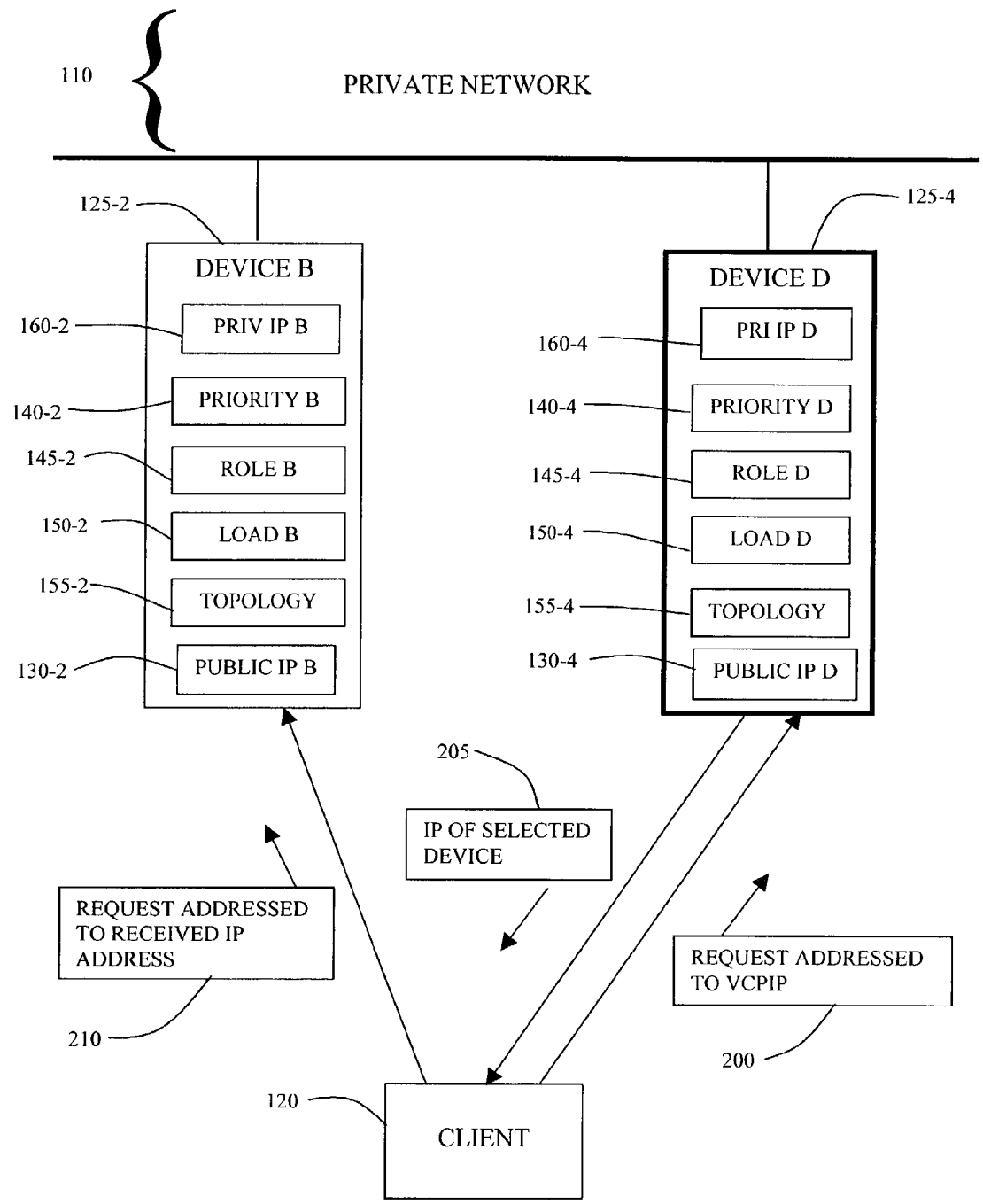
FIG. 2 is a part block diagram, part data flow diagram showing a subset of elements from the computer environment of FIG. 1.

FIG. 2 illustrates the operation of the VPN cluster 105 in load balancing the connections between a client 120 and the private network 110. FIG. 2 is a part block diagram/part data flow diagram having a subset of elements from FIG. 1 including more detailed illustration of the network interface devices 125.

FIG. 2 shows Device B 125-2, a non-master device in the virtual cluster 105, and Device D 125-4, the master device in this embodiment, connected to private network 110. In addition to the unique public IP address 130 and unique private IP address 160, each network interface device 125 has a priority 140, a role 145, a load 150, and a copy of the cluster topology 155. Priority 140 is a number assigned to each device 125 typically related to its hardware and software capabilities. In the present embodiment of the invention, priority is a number between 1 and 10. Priority 140 is configurable, however, and may be set according to an alternative criteria. The role 145 typically states whether the device 125 is acting as a master or as a non-master, and can also be used for other purposes such as to indicate whether a device 125 is going out of service for maintenance. The load 150 is a value representing the number of connections in relation to a configured maximum number of connections on each device. Load 150 will be described in greater detail below in relation to FIG. 3.

The information included in the cluster topology 155 includes a status and load on each device 125 in the cluster and also the VCPIP 135. The cluster topology 155 is updated regularly with information received from the master device 125-4 in the virtual cluster 105. In alternative embodiments of the invention, the cluster topology 155 also includes information related to administering, maintaining and managing cluster topology, health and designation/load balancing of connections and state information of connections. Since each network interface device in the virtual cluster 105 knows of every other device, cluster status can be obtained from any active device in the virtual cluster 105. Status information typically includes the number of devices in the cluster along with their IP addresses and loads.

In a first embodiment of the invention, when the client 120 initiates a connection to the private network 110, the client 120 transmits a initial request 200 addressed to the VCPIP 135.

Device D 125-4, as master device, responds to the request 200 addressed to the VCPIP 135. Device D 125-4 accepts the client request 200 and determines, based on the status and load of each device, which device in the VPN cluster 105 should handle the client request 200. The mechanism of this determination will be described below. In this example, Device D 125-4 is aware that Device B 125-2 is operational and that the load on Device B 125-2 is low compared to other devices in the cluster 105. Device D 125-4 selects Device B 125-2 to handle the client request 200. Device D 125-4 then transmits a return message 205 to the client 120 containing the IP address of the device selected by Device D 125-4. That is, Device D 125-4 transmits IP B 130-2 in the return message 205 to the client 120.

The client 120 addresses further transactions 210 to the selected device, Device B 125-2, using public IP B 130-2. If the master device determines that it is the best device to handle a connection, the master device sends its public IP address to the requesting client. In this example, Device D 125-4 would transmit its own IP address, IP D 130-4 to the client 120.

In a second embodiment of the invention, the initial request 200 initiates an Internet Key Exchange (IKE) negotiation with the master device 125-4. IKE is an Internet Engineering Task Force recommended protocol for secure network communications. IKE is based on a frame work protocol called Internet Security Association and Key Management Protocol (ISAKMP) and implements the Oakley key exchange. IKE is therefore also known as ISAKMP/Oakley. In the IKE negotiation, the client 120 and the master device, Device D 125-4, negotiate encryption and authentication policies.

The master device 125-4, at the completion of the IKE Phase 1 negotiation, sends an encrypted IKE notify payload with the IP address of the concentrator selected to handle the client's communication with the VPN.

In the second embodiment of the invention, the client 120, after receiving the IKE notify payload from the master device 125-4, initiates an IKE negotiation for encryption and authentication with the selected device, Device B 125-2. After successful conclusion of this negotiation, a tunnel between the client and the VPN is established.

By having a master device distribute connections among devices in the virtual cluster 105, the virtual cluster 105 maintains a balanced load of connections from the clients 120 to the private network 110.

In an alternate embodiment of the invention, the virtual cluster 105 is located behind a network address translation (NAT) device. In that embodiment, the IP address transmitted to the requesting client 120 by the master device 125-4 may not be the public IP address 130 of the selected concentrator 125. If the IP address transmitted to the client 120 by the master device 125-4 is not the public IP address 130 of the concentrator 125, the transmitted IP address needs to be configured to the mapped address on the NAT device. The master device sends the mapped NAT IP address to the requesting client.

Figure 3A:
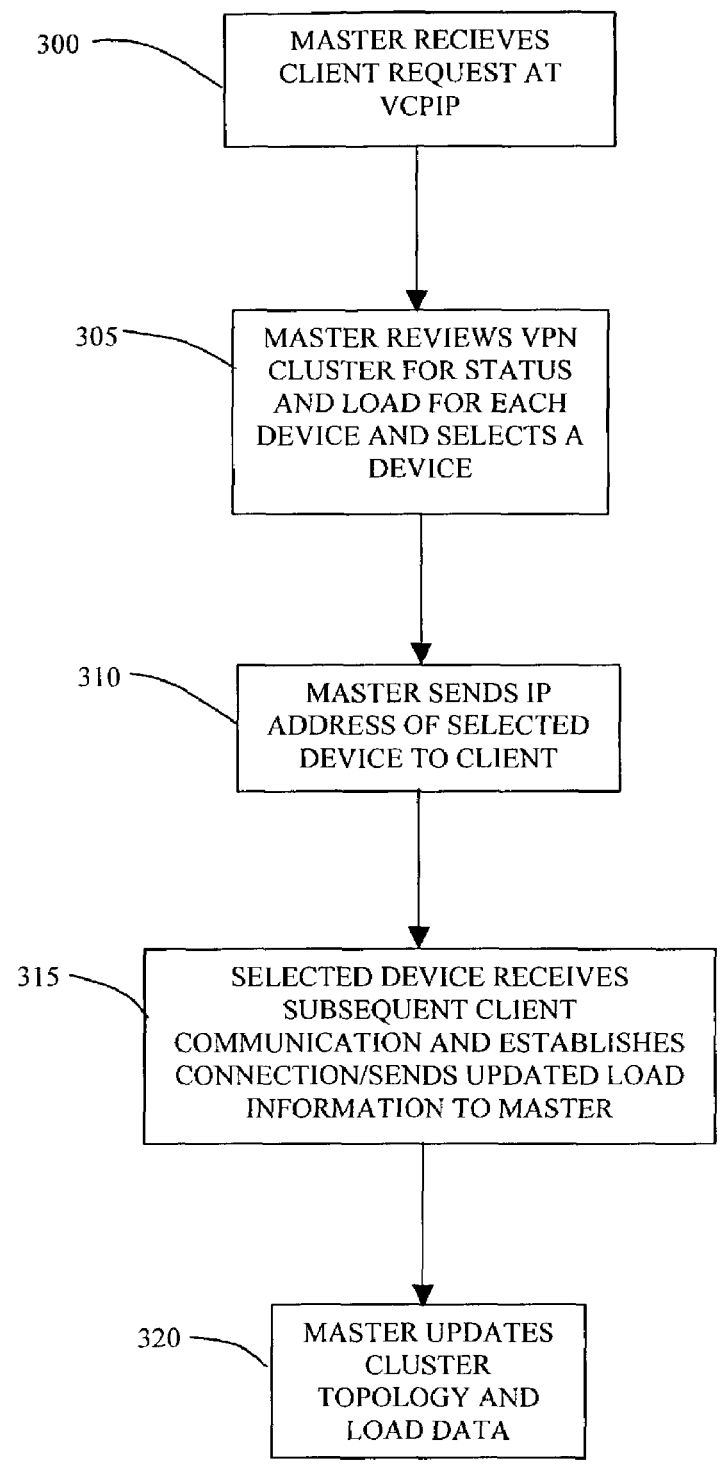
FIG. 3A is a flow chart of a first embodiment of the operation of virtual cluster of FIG. 1.

FIG. 3A is a flow chart further illustrating the operation of the VPN cluster 105 according to the first embodiment of the invention described above with regard to FIG. 2.

In step 300, the master device in the VPN cluster 105 receives an initial request 200 from a client 120 addressed to the VPN cluster IP address, the VCPIP 135.

In step 305, the master device 125-4 reviews the cluster topology 155 for the status of each device 125, that is, whether a particular concentrator is operational or not. The master device 125-4 also reviews the load 150 on each concentrator 125 in the virtual cluster 105. Based on status and load 150, the master device 125-4 selects a concentrator 125 to handle the connection between the client 120 and the private network 110. In a first method of calculating the load 150 of a cluster device, the load is determined by the ratio of active connections to a configured maximum allowed connections. In a second load calculation method, the load is the ratio of the number of active and backup connections to the configured maximum allowed connections. In the present embodiment of the invention, the load is expressed as a percentage. The number of maximum allowed connections is typically different from the maximum number of connections that the particular concentrator can handle. This means that the maximum number of connections can be reconfigured in order to limit the load on particular concentrators in order to increase bandwidth for each client.

In alternative embodiments of the invention, factors other than load (or in addition to load) are taken into account by the master device in assigning a connection to a particular concentrator. These other factors include, but are not limited to, the number of "hops" between client and server(s) in the public network 115 and private network 110, and packet latency/round trip delay.

In distributing connections among the concentrators in the virtual cluster 105 to balance load, the master device 125-4 generally acts to ensure that other the cluster devices 125-1, 125-2 and 125-3 are more heavily loaded than the master device 125-4. This provides a greater likelihood that the master device 125-4 has the required resources to handle initial requests for connection and to distribute the connections in the virtual cluster 105.

In step 310, the master device 125-4 sends the IP address of the selected device 125-2 to the client 120. If the master device 125-4 determines that it should handle the connection, the master device 125-4 sends its own IP address 130-4 to the client 120.

In step 315, the selected device 125-2 receives subsequent client communications and establishes a connection between the client 120 and the private network 110. The selected device 125-2 also sends updated load information, including the new connection, to master device 125-4. In this embodiment, the updated load information is included in a periodic message sent to the master device 125-4 confirming that the non-master device is still operational. This message is called a KEEPALIVE message and will be described in more detail below.

In step 320, the master device 125-4 updates its records of cluster topology 155 and load data based on the message received from the selected device 125-2. The master device 125-4 also sends updates of the cluster topology 155 and load information 150 to all other concentrators 125 in the virtual cluster 105.

Figure 3B:
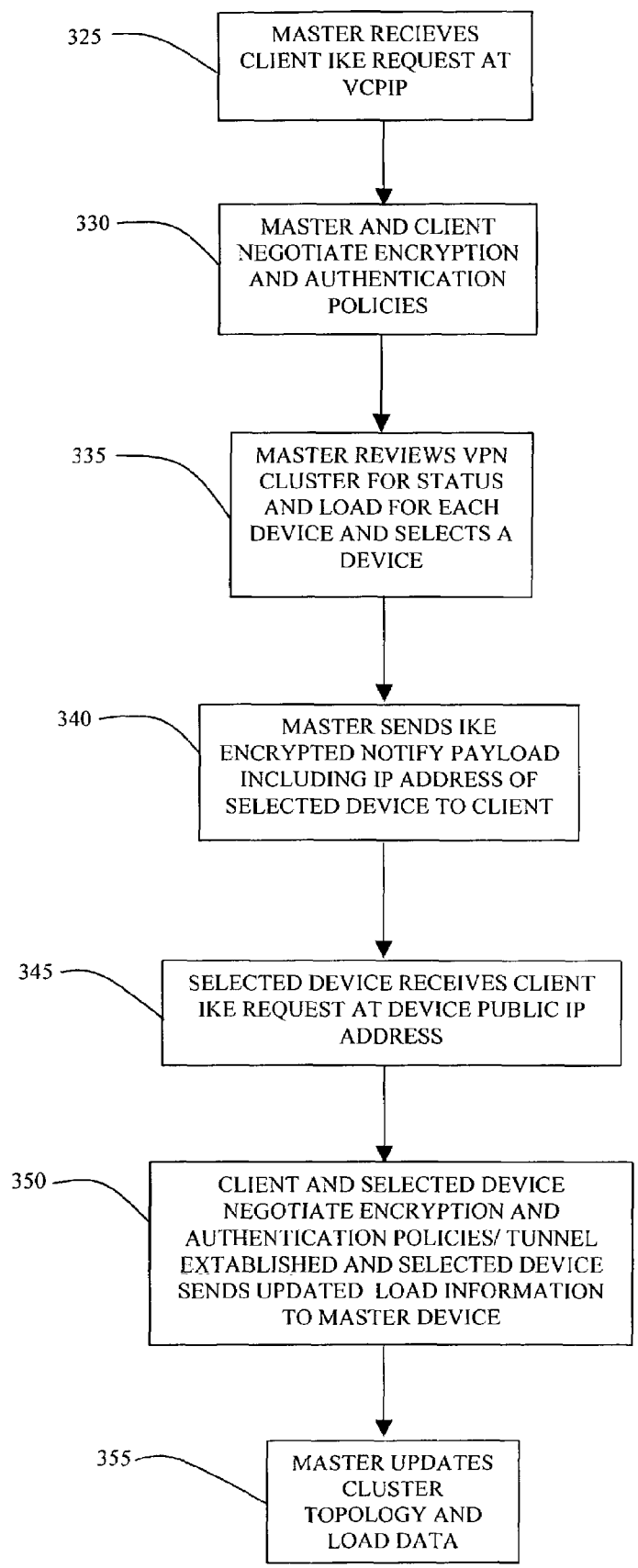
FIG. 3B is a flow chart of a second embodiment of the operation of the virtual cluster of FIG. 1.

FIG. 3B is a flow chart further illustrating the operation of the VPN cluster 105 according to the second embodiment of the invention described above with regard to FIG. 2.

In step 325, the master device 125-4 receives from the client 120 an IKE request at the virtual address VCPIP 135 which initiates a negotiation between the master device 125-4 and the client 120.

In step 330, the master 125-4 and client 120 negotiate encryption and authentication policies in response to the IKE request.

In step 335, the master 125-4 reviews the cluster 105 for the status and the load on each device 125 in the cluster 105 and selects a device to handle the communications resulting from the client's request.

In step 340, the master 125-4 sends to the client 120 an IKE encrypted notify payload including an IP address of the selected device 125-2.

In step 345, the selected device 125-2 receives an IKE request at its public address 130-2.

In step 350, the client 120 and the selected device 125-2 negotiate encryption and authentication policies. At the successful conclusion of negotiation, a tunnel is established between the client 120 and the VPN 110. The selected device 125-2 and sends updated load information to the master device 125-4.

In step 355, the master device 125-4 updates the storage cluster topology 155 and load data 150 in response to the information sent by the selected device 125-2.

Figure 4:
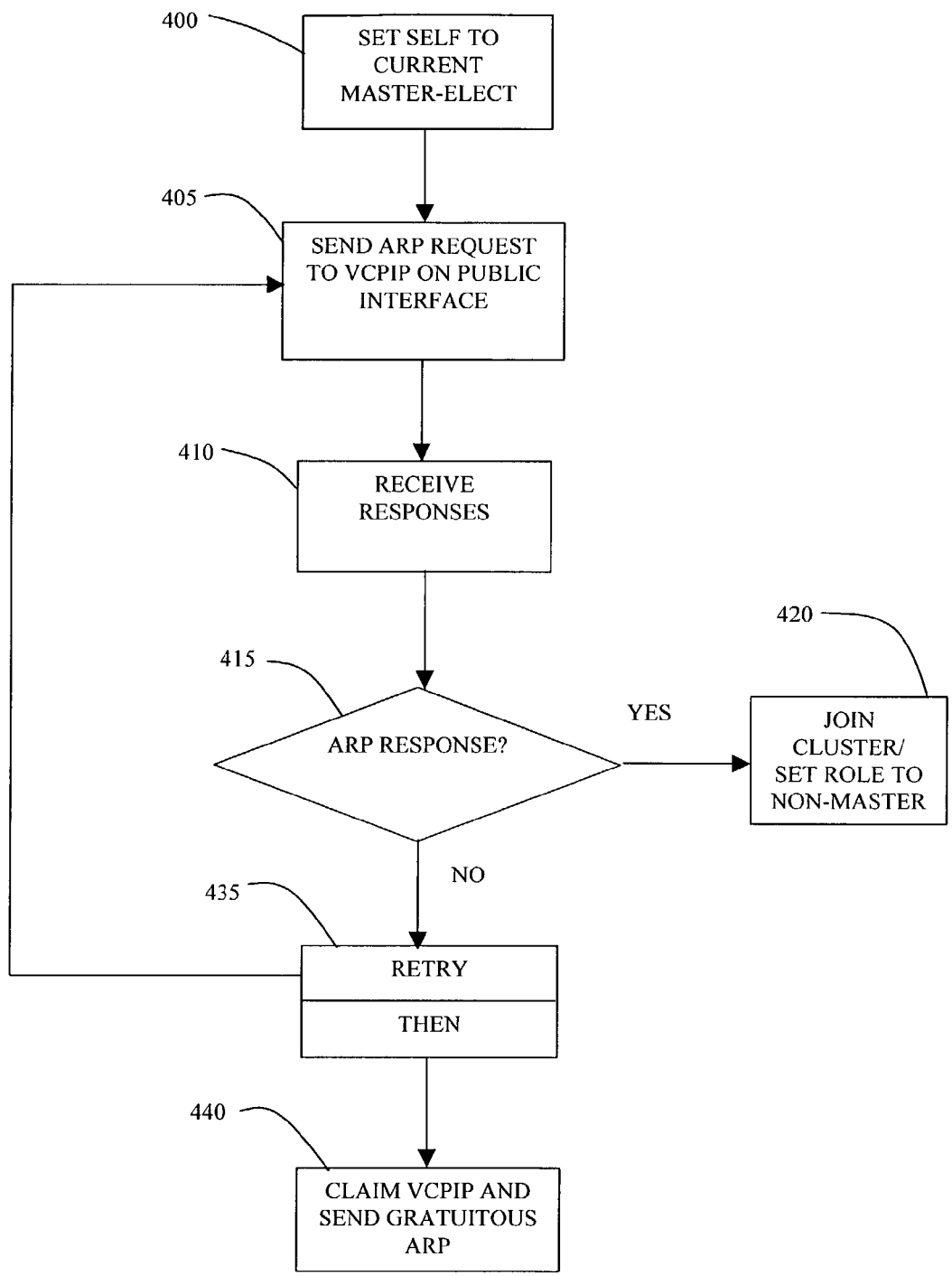
FIG. 4 is a flow chart of the process of electing/re-electing a master device in the virtual cluster of FIG. 1.

FIG. 4 is a flow chart of the process of determining a master device at virtual cluster start-up and also the process of re-electing a new master device in the virtual cluster 105 if the already-elected master device becomes inoperational.

The method is described from the perspective of one network interface device 125, referred to for the purpose of clarity as the "current device." At virtual cluster start-up, all of the network interface devices in the virtual cluster 105 execute the method. After start-up, those network interface devices detecting an absence of the master device execute the method. The master device may either be actually inoperational or the network interface device may not have received confirmation messages from the master device due to a network error, for example. Non-master devices in the virtual cluster 105 send periodic KEEPALIVE request to the master device, to be described below in relation to FIG. 5. When the master device receives a KEEPALIVE request from a non-master, the master device responds with a KEEPALIVE response. Once a non-master device detects the loss of three consecutive KEEPALIVE responses, the non-master device assumes that the master device has failed. The non-master device then initiates its master election process.

In step 400, at start-up or if a new master device needs to be elected in the cluster, the current device sets the current master-elect value to itself. In the present embodiment of the invention, the master-elect value is part of the cluster topology 155. The current device, however, does not yet assume the VCPIP 135.

In step 405, the current device sends an address resolution protocol (ARP) request to the VCPIP 135 which will consequently be received by the other network interface devices in the virtual cluster 105.

In step 410, the current device receives responses from the other devices in the cluster. The ARP response includes the MAC address of the current master.

In step 415, the current device determines whether one of the received responses was an ARP from a master device.

Figure 5:
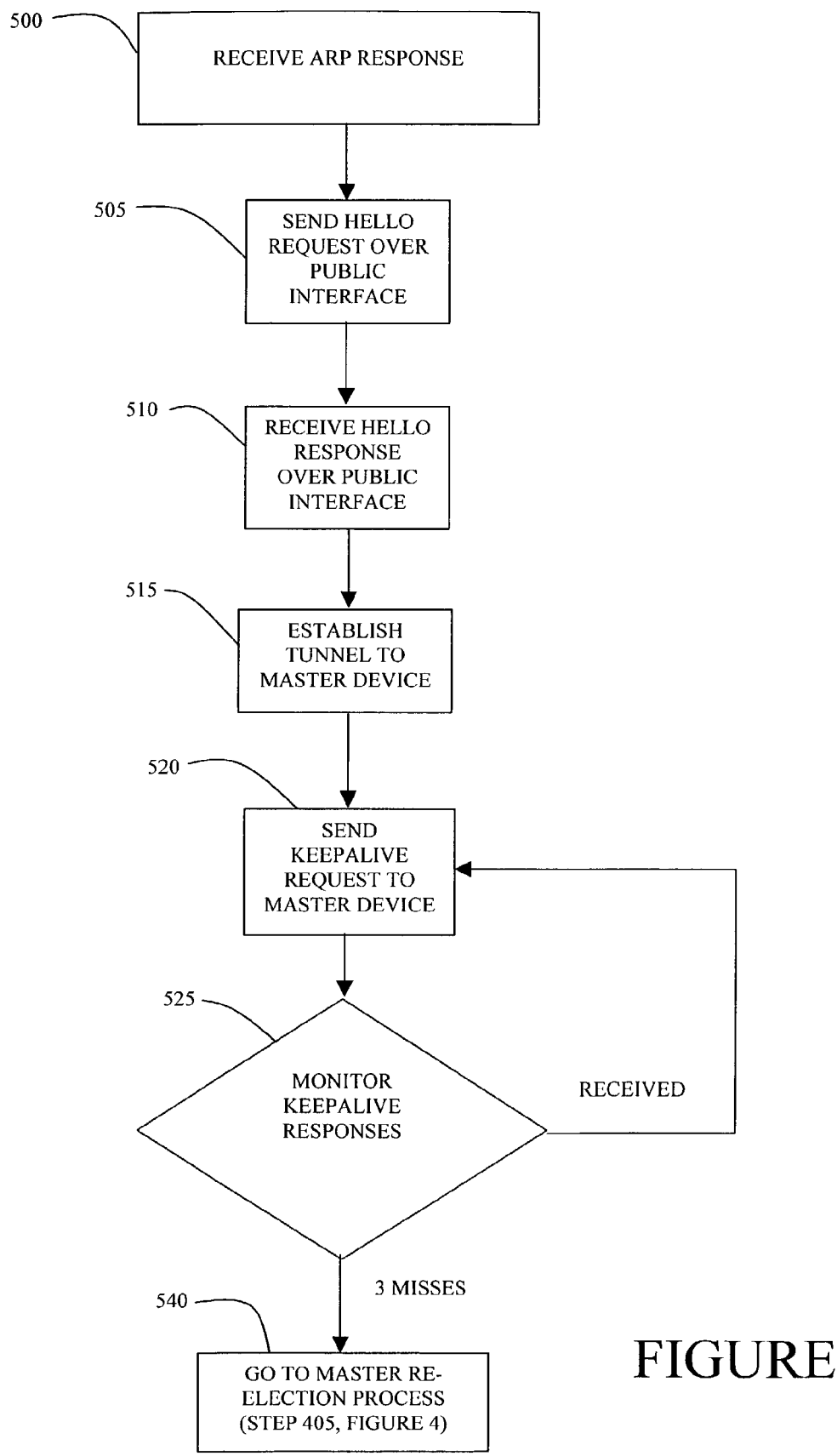
FIG. 5 is a flow chart of the process of joining a new network interface device to the virtual cluster of FIG. 1.

In step 420, if an ARP response was received, the current device joins the cluster as a non-master as described with regard to FIG. 5.

In step 435, if no ARP responses were received claiming the role of master, a timeout variable is incremented. If the priority of the device minus the timeout variable is <=0, then the device claims the role of master device and the VCPIP. Priority is the relative priority within the cluster of a particular device. Each device is assigned a priority at configuration, for example a number between 1 and 10. In the present embodiment, the device having the lowest number has the higher likelihood of become the master device. In one embodiment of the invention, the network interface device having the lowest priority value in the cluster is the designated master device at cluster startup. In another embodiment, no priority is pre-configured and a default mapping is used based on the hardware and software capability of the network interface devices. In the event that several network interface devices have the same priority, the network interface device having the lowest IP address is elected master device. The device having the lowest priority value is not necessarily always the master device in the cluster. If a device having a low priority value joins an operating cluster, it joins as a non-master because master re-election is not triggered in that situation.

Further, in step 435, if no responses from network interface devices responding to the ARP for VCPIP are received, the current device retries by sending another ARP request, returning to step 405. The current device retries until the priority value of the device minus the timeout variable is <=0. After retrying n times without success, the requesting device executes the process at step 440.

In step 440, the current device resets its role to master and assumes the VCPIP 135. The newly elected master device assumes the VCPIP 135 by sending out a gratuitous address resolution protocol (ARP) request. It is gratuitous because the VCPIP 135 is already available for use by the new master device. The gratuitous ARP serves the function of notifying the other network interface devices in the virtual cluster 105 that the VCPIP 135 has been claimed.

FIG. 5 is a flow chart of the process of a device joining a cluster and operating within the cluster. The process illustrated in FIG. 5 is a continuation of step 420 of FIG. 4.

At step 500, a network interface device, attempting to join the virtual cluster 105 receives an ARP response for VCPIP from the master device in response to an ARP request. The network interface device attempting to join the virtual cluster 105 is referred to within the description of this method as the "joining device."

At step 505, the joining device sends a HELLO request to the master device at the public interface, that is, addressed to the VCPIP 135. The HELLO request is a handshake message to establish a connection between the joining device and the master device in the virtual cluster 105. Included in the HELLO request is an option of operating in the cluster in encrypted mode or non-encrypted mode. The HELLO request further contains a priority, a role and a device type of the master device.

At step 510, the master device sends a HELLO response to the joining device over the public interface. The master device then sends a HELLO request of its own to the joining device over the public interface of the virtual cluster 105.

At step 515, after the joining device receives the master device HELLO response, the handshake between the joining device and the master device is complete, and a tunnel is established between the joining device and the master device. In one embodiment of the invention, the tunnel is established using the IPSec protocol.

At step 520, the joining device sends a KEEPALIVE request to the master device at its private IP address 160-4. The joining device sends KEEPALIVE requests to the master device on a periodically as part of normal operation. The KEEPALIVE request message typically contains the current session load, CPU load, time for master to expect next KEEPALIVE request, and number of current active connections. Other information could also be included in the KEEPALIVE request message. The present invention is not limited to the listed items. The master device maintains cluster topology information based on KEEPALIVE requests received from the non-master devices in the virtual cluster 105.

The time interval between the transmission of KEEPALIVE requests from a non-master network interface device, i.e., the KEEPALIVE interval, is defined, in the present embodiment, in units of seconds and a range between 0 and 600. The KEEPALIVE interval defines how frequently a non-master network interface device attempts to communicate with the master device. The KEEPALIVE interval is transmitted from a non-master device in a KEE- PALIVE request so that the master device knows when to expect the next communication.

In the present embodiment of the invention, KEEPALIVE messages are transmitted via UDP over default master device port number 9023. The port number is configurable and alternative embodiments of the invention may use other ports. For example, if the UDP port number presents a conflict to an existing customer network configuration, it can be reconfigured, however, the network interface devices in the virtual cluster 105 need to be configured with the same UDP port number.

In an alternative embodiment of the invention, when an existing device needs to be taken out of the virtual cluster 105 for planned downtime, the device will send a out-of-service message to the master indicating that it wishes to be taken out-of-service. The master device then indicates the out-of-service condition to all other devices in the cluster as described in the operation of the master device in relation to FIG. 6.

At step 525, the joining device monitors the responses to its KEEPALIVE requests. The master device responds to each received KEEPALIVE request with a KEEPALIVE response. The KEEPALIVE response typically contains the least loaded device information.

At step 540, the joining device has detected three misses from the master device where the master device has failed to respond to KEEPALIVE requests three times successively. The joining device in this situation begins the master re-election process described in relation to FIG. 4.

Figure 6:
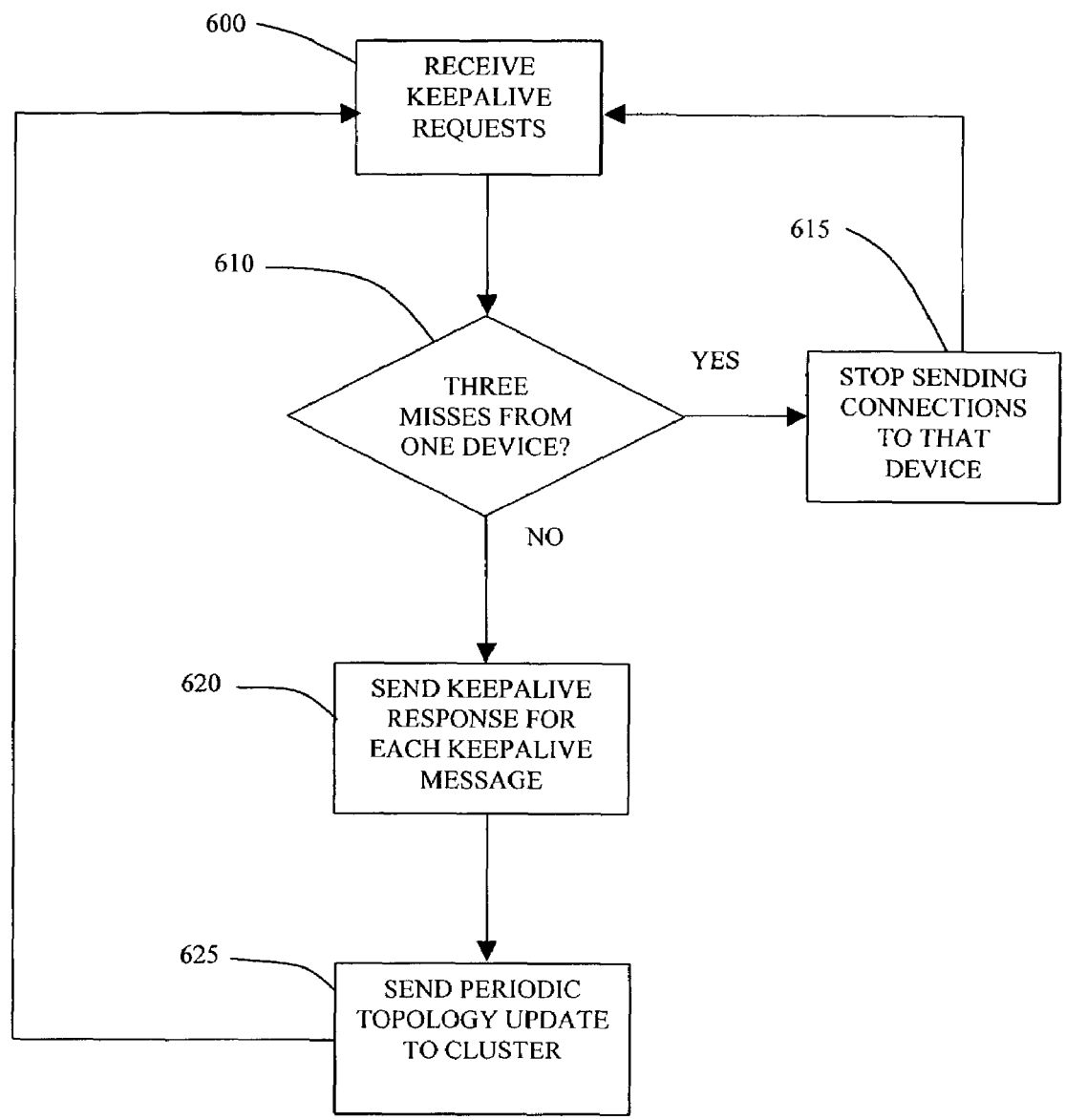
FIG. 6 is a flow chart of the operation of the master device in the virtual cluster of FIG. 1; and, FIG. 7 is a block diagram of the virtual cluster of FIG. 1 implemented as an application in a computer system and stored on a computer-readable medium.

FIG. 6 is a flowchart of the operations of the master device in the virtual cluster 105. In step 600, the master device receives KEEPALIVE messages from the non-master network interface devices in the virtual cluster 105. The master device maintains topology information from all other devices in the cluster and updates the topology information with information received in KEEPALIVE requests.

In step 610, the master device monitors KEEPALIVE messages from the non-master devices, verifying that the non-master devices in the virtual cluster 105 are operating. The master device knows when to expect the next KEEPALIVE request message from each non-master device in the virtual cluster 105. The master device maintains a record a record of missing KEEPALIVE requests.

In step 615, if the master device detects three misses in receiving KEEPALIVE requests from a particular device within an expected period, the master device presumes that that particular network interface device has failed and stops sending connections to that particular network interface device. The master device also notifies the other non-master network interface devices in the cluster that the particular device is not operational.

In step 620, the master device sends a KEEPALIVE response for each received KEEPALIVE request.

In step 625, the master device sends periodic topology updates to the virtual cluster 105. The topology updates typically include the status of the devices in the virtual cluster 105, and load on the devices in the virtual cluster 105. Periodically new devices are added to the virtual cluster 105 and existing devices are taken out-of-service for administrative purposes (i.e. planned down-time). The master device includes device additions and deletions in the topology updates.

Figure 7:
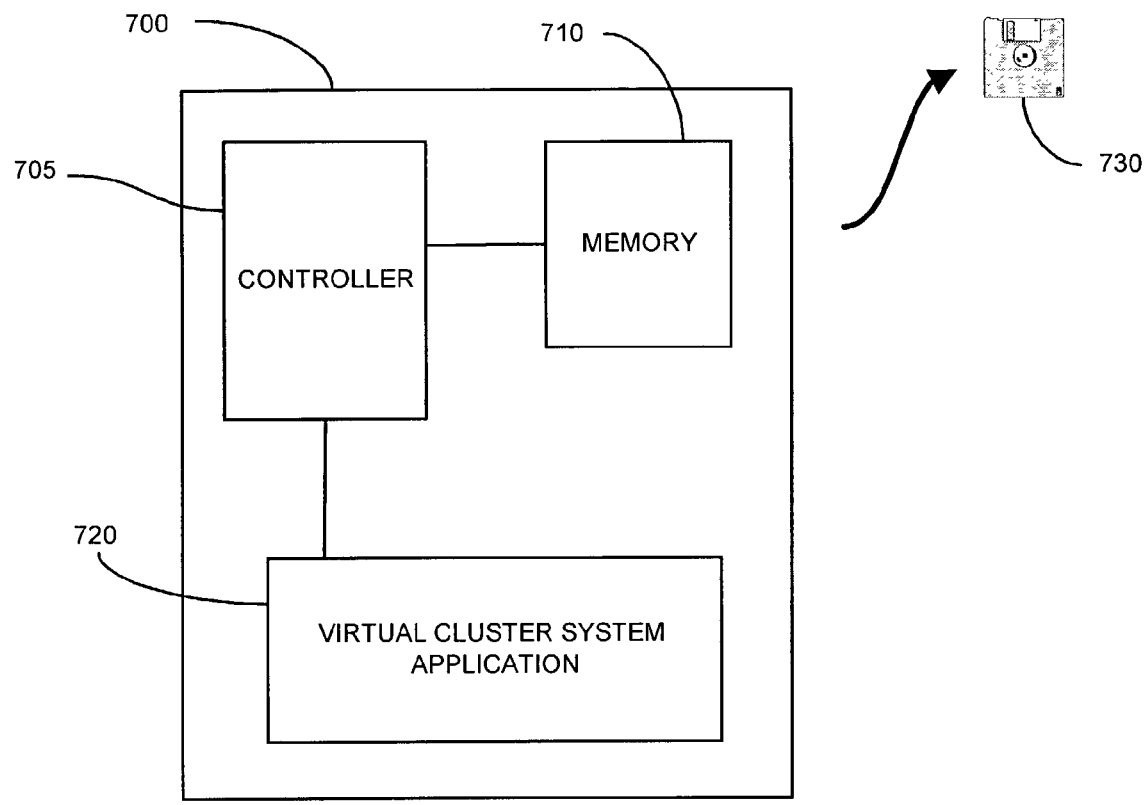

FIG. 7 shows an alternative embodiment of the invention in which the virtual cluster 105 is implemented in a computer system having a controller and a memory. The virtual cluster application is installable from a computer-readable medium. In accordance with this embodiment and as shown in FIG. 7, a computer system 700 has a controller 705 connected to a memory 710. The controller is also connected to a virtual cluster application 720 stored in the computer system 700. The controller 705 executes the processes of the virtual cluster system 720. A program for the network security application 720 is stored in a readable format in a computer-readable medium 730.

In an alternative embodiment, the virtual cluster 105 can include network interface devices that are not on the same LAN. For example, the VPN virtual cluster could include devices in San Jose, Houston and Boston. The VPN virtual cluster, knowing the geographic area of the client, assigns an actual connection to a network interface device accordingly.

The invention described above provides the benefits of a load balanced VPN network interface having a minimum of configuration complexity. Clients share a plurality of network interface devices providing greater availability and lower latency of connections to the VPN than non-shared systems.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a VPN virtual cluster that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a VPN virtual cluster that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. In a master concentrator device, a method for balancing incoming client connection requests among a plurality of concentrator devices configured in a cluster arrangement, including the master concentrator device, the plurality of concentrator devices providing access to a virtual private network, the method comprising the steps of:

receiving load data describing current load conditions of the concentrator devices wherein the load is a ratio of a current number of connections in a particular concentrator to a configured value of maximum allowed connections for the particular concentrator, wherein said value of maximum allowed connections is different than a maximum number of connections the particular concentrator can handle in order to limit load on said particular concentrator, which includes:

receiving a KEEPALIVE message transmitted by each concentrator device on a reoccurring basis, said KEEPALIVE message containing the load of a transmitting concentrator device and indicating that the transmitting concentrator device is operative and immediately sending a response to the transmitting concentrator device for each received KEEPALIVE message, said response including least loaded concentrator device data;

providing a virtual cluster address in order to receive client virtual private network connection requests for access to the virtual private network, said virtual cluster address providing a public interface for a virtual private network client to access the virtual private network;

receiving from the virtual private network client an initial client connection request for a virtual private network connection, said initial client connection directed to the virtual cluster address;

selecting one of the plurality of concentrator devices based upon the load data describing current load conditions of the concentrator devices, said selected device to handle said virtual private network connection; and transmitting, to the virtual private network client, an address of the selected concentrator device.

2. The method of claim 1 further comprising the step of recording missed KEEPALIVE messages and removing a particular concentrator device from said cluster if said particular concentrator device has missed a selected number of KEEPALIVE messages.

3. The method of claim 1 further comprising the step of sending a periodic cluster topology message to each said concentrator device in the cluster.

4. The method of claim 1 wherein said selecting step further comprises selecting said one concentrator device such that the master concentrator device has a low load with respect to the other concentrator devices of said plurality.

5. The method of claim 1 wherein said selecting step further comprises selecting said one concentrator device based on the number of "hops" between said virtual private network client and a requested server in the virtual private network.

6. The method of claim 1 wherein said selecting step further comprises selecting said one of the plurality of concentrator devices based on packet latency associated with each of said plurality of concentrator devices.

7. The method of claim 1 wherein said initial client connection request is an IKE request initiating a step of negotiating with said client authentication and encryption policies; and said transmitting step further comprises transmitting said address via an encrypted IKE notify payload message.

8. A computer program product having a computer-readable medium including computer program logic encoded thereon that, when performed on a computer system directs the computer system to perform the method of:

receiving load data describing current load conditions of the concentrator devices wherein the load is a ratio of a current number of connections in a particular concentrator to a configured value of maximum allowed connections for the particular concentrator, wherein said value of maximum allowed connections is different than a maximum number of connections the particular concentrator can handle in order to limit load on said particular concentrator, which includes:

receiving a KEEPALIVE message transmitted by each concentrator device on a reoccurring basis, said KEEPALIVE message containing the load of a transmitting concentrator device and indicating that the transmitting concentrator device is operative and immediately sending a response to the transmitting concentrator device for each received KEEPALIVE message, said response including least loaded concentrator device data;

providing a virtual cluster address in order to receive initial client connection requests for access to the virtual private network, said virtual cluster address providing a public interface for a virtual private network client to access the virtual private network;

receiving from the virtual private network client an initial client connection request for a virtual private network connection, said initial client connection directed to the virtual cluster address;

selecting one of the plurality of concentrator devices based upon the load data describing current load conditions of the concentrator devices, said selected device to handle said virtual private network connection; and transmitting, to the virtual private network client, an address of the selected concentrator device.

9. The method of claim 1 further comprising resetting said configured value of maximum allowed connections on said particular one of said plurality of concentrators to control load on a said one particular concentrator.

10. The computer program product of claim 8 further comprising resetting said configured value of maximum allowed connections on said particular one of said plurality of concentrators to control load on a said one particular concentrator.

11. The method of claim 1 further comprising resetting said configured value of maximum allowed connections on said particular one of said plurality of concentrators to increase bandwidth for at least one client.

12. The computer program product of claim 8 further comprising resetting said configured value of maximum allowed connections on said particular one of said plurality of concentrators to increase bandwidth for at least one client.

13. The method of claim 1 wherein said KEEPALIVE message further includes CPU load, time to expect another KEEPALIVE message and a number of current active connections.

* * * * *